(12) United States Patent
Amiri et al.

(10) Patent No.: US 9,107,090 B1
(45) Date of Patent: Aug. 11, 2015

(54) METHOD AND APPARATUS FOR CORRELATING WIRELESS LOCAL AREA NETWORK COMMUNICATION PARAMETERS WITH SUBSCRIBER STRUCTURE

(71) Applicant: Quantenna Communications, Inc., Fremont, CA (US)

(72) Inventors: Bahador Amiri, Los Gatos, CA (US); Sam Heidari, Los Altos Hills, CA (US); Hossein Dehghan, Diablo, CA (US)

(73) Assignee: Quantenna Communications, Inc., Fremont, CA (US)

( * ) Notice: Subject to any disclaimer, the term of this patent is extended or adjusted under 35 U.S.C. 154(b) by 137 days.

(21) Appl. No.: 13/907,814

(22) Filed: May 31, 2013

Related U.S. Application Data

(60) Provisional application No. 61/654,009, filed on May 31, 2012.

(51) Int. Cl.
| | |
|---|---|
| *H04W 4/00* | (2009.01) |
| *H04W 24/02* | (2009.01) |
| *H04L 29/06* | (2006.01) |
| *H04L 12/28* | (2006.01) |

(52) U.S. Cl.
CPC ........... *H04W 24/02* (2013.01); *H04L 12/2818* (2013.01); *H04L 63/101* (2013.01)

(58) Field of Classification Search
CPC .......................... H04L 63/101; H04L 12/2818
USPC ....................................................... 370/338
See application file for complete search history.

(56) References Cited

U.S. PATENT DOCUMENTS

| | | | |
|---|---|---|---|
| 8,712,679 B1 | 4/2014 | Mostofi et al. | |
| 2011/0247052 A1* | 10/2011 | Kim et al. | 726/4 |
| 2012/0136623 A1* | 5/2012 | Edge et al. | 702/150 |

OTHER PUBLICATIONS

A. Tayebi, J. Gomex, F. Saiez De Adana, O. Gutierrez; of the Computer Sciences Department, University of Alcala, Madrid 28871 Spain; "The Application of Ray-Tracing to Mobile Localization using the Direction of Arrival and Received Signal Strength in Multipath Indoor Environments"; Progress in Electromagnetics Research, PIER 91; 1-15; 2009.
K. Whitehouse, C. Karlof, D. Culler; "A Practical Evaluation of Radio Signal Strength for Ranging-Based Localiization" ACM Sigmobile, Mobile Computing and Communications review, vol. 11, Issue 1, Jan. 2007 pp. 41-52, ACM New York, NY, USA.
D.B. Faria; Stanford University; "Modeling Signal Attenuation in IEEE 802.11 Wireless LANs" vol. 1 Technical Report TR-KP06-0118, Kiwi Project, Standord University, Jul. 2005.

* cited by examiner

*Primary Examiner* — Sai-Ming Chan
(74) *Attorney, Agent, or Firm* — IP Creators; Charles C. Cary

(57) ABSTRACT

A structural correlation manager for managing wireless local area networks (WLAN) each supporting wireless communications between an associated access point node and associated station nodes on a corresponding one of a plurality of communication channels across an available spectrum. The apparatus comprises a structural correlation manager including a structural identifier to identify an architectural structure surrounding the WLAN; and a correlator configured to correlate the architectural structure surrounding the nodes and the communication parameters utilized by the nodes to maximize wireless communications within structure and minimize wireless communications outside the structure.

5 Claims, 7 Drawing Sheets

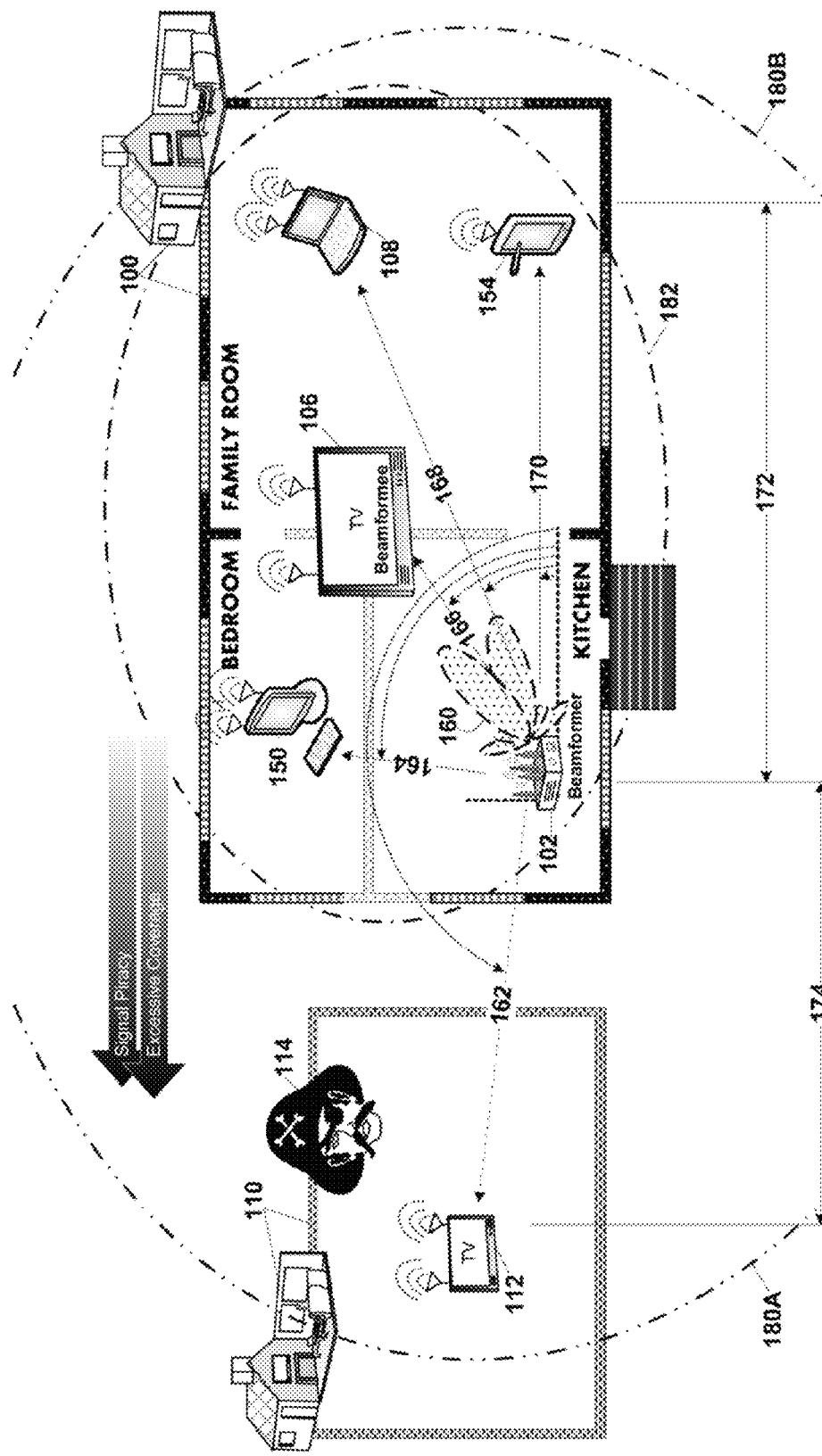
FIG. 1C  CORRELATE MIMO SIGNAL RANGE & DIRECTION WITH SUBSCRIBER STRUCTURE

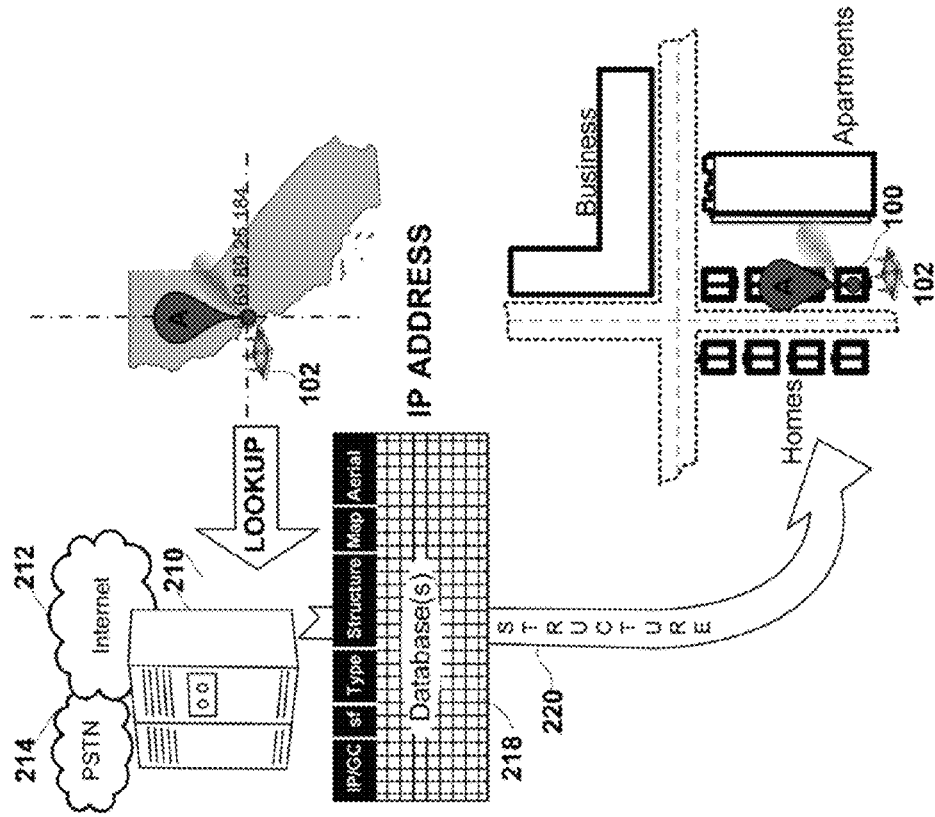
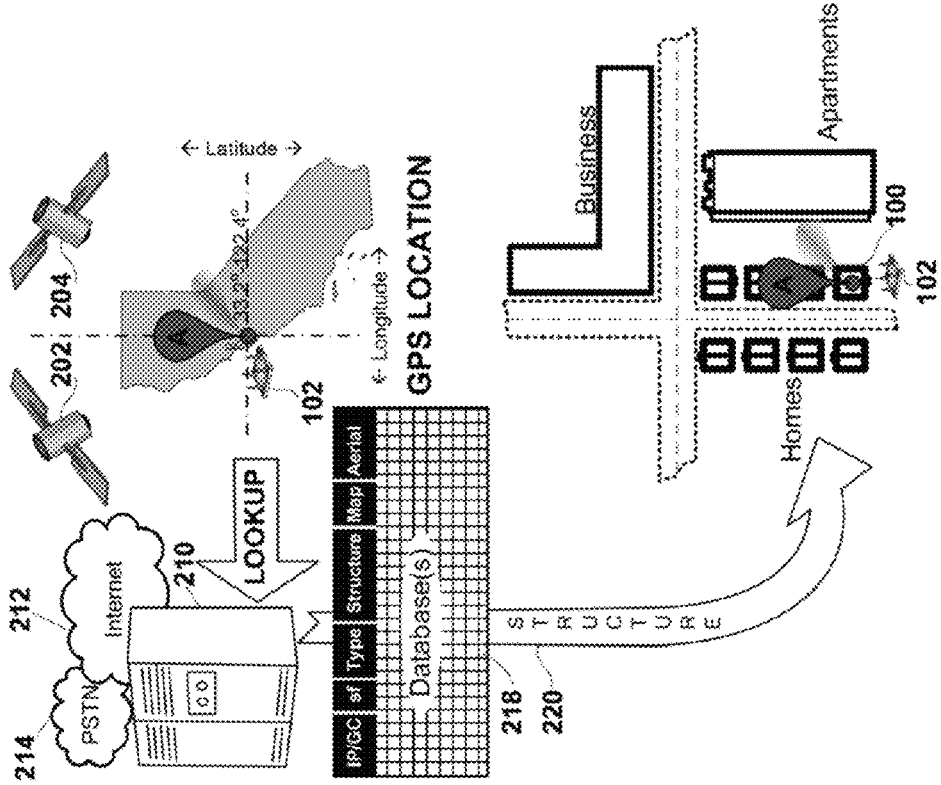
DETERMINATION OF SUBSCRIBER STRUCTURE FROM WAP LOCATION

EXTERNAL CORRELATION OF COMMUNICATIONS WITH STRUCTURE

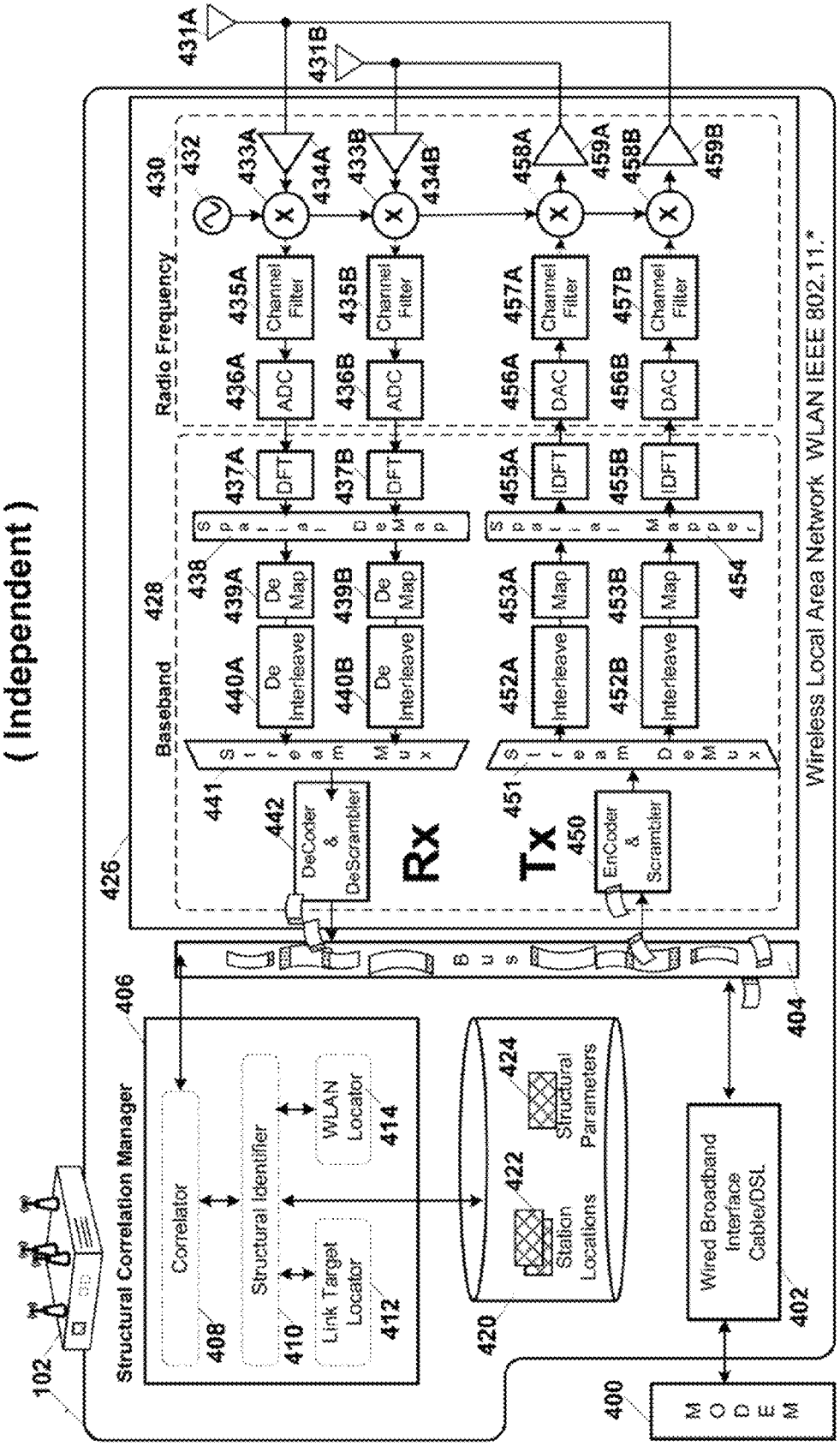
FIG. 4A Wireless Home Network correlating Communications with Structure (Independent)

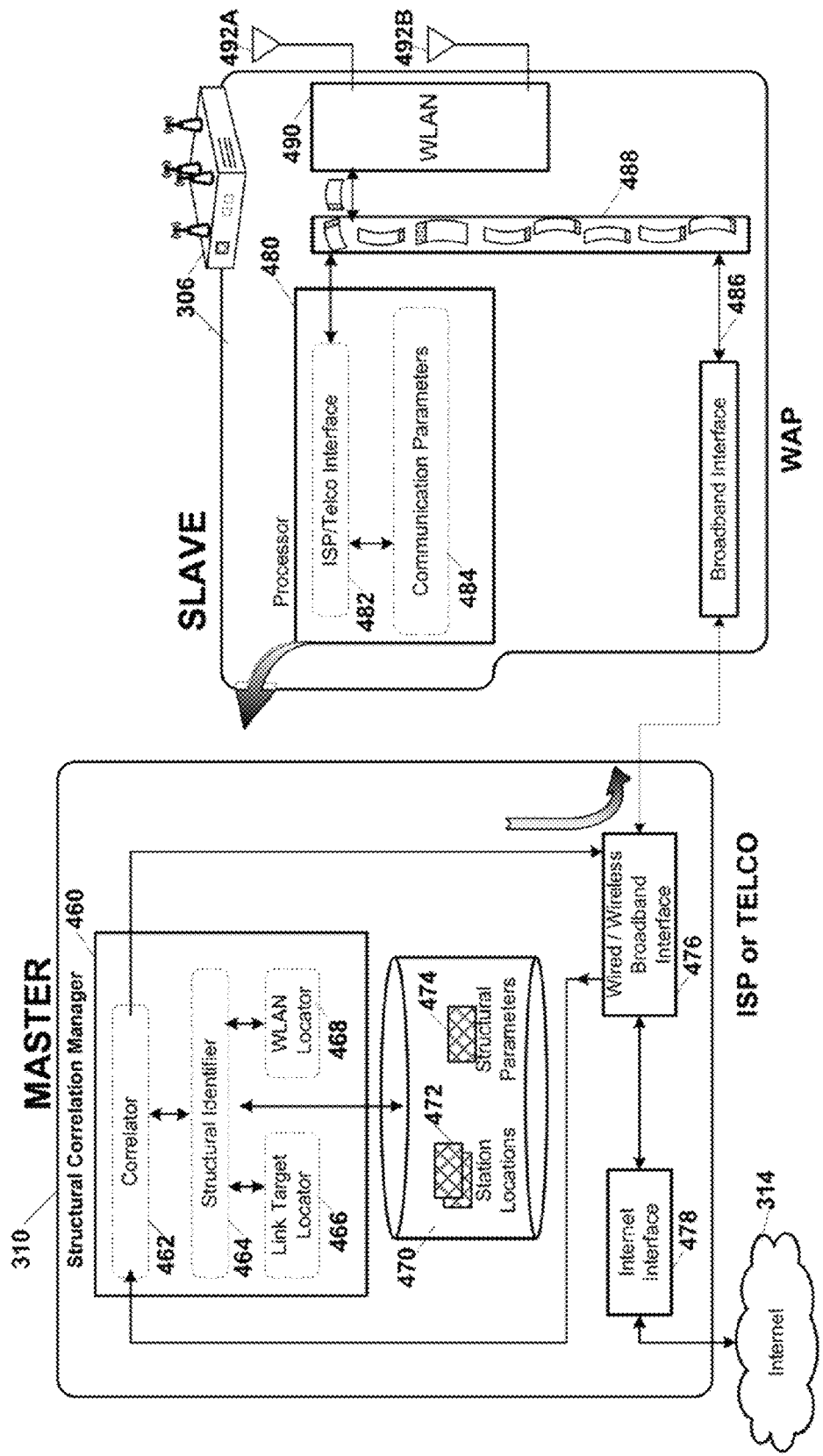
FIG. 4B  Wireless Home Network correlating Communications with Structure
( Master-Slave )

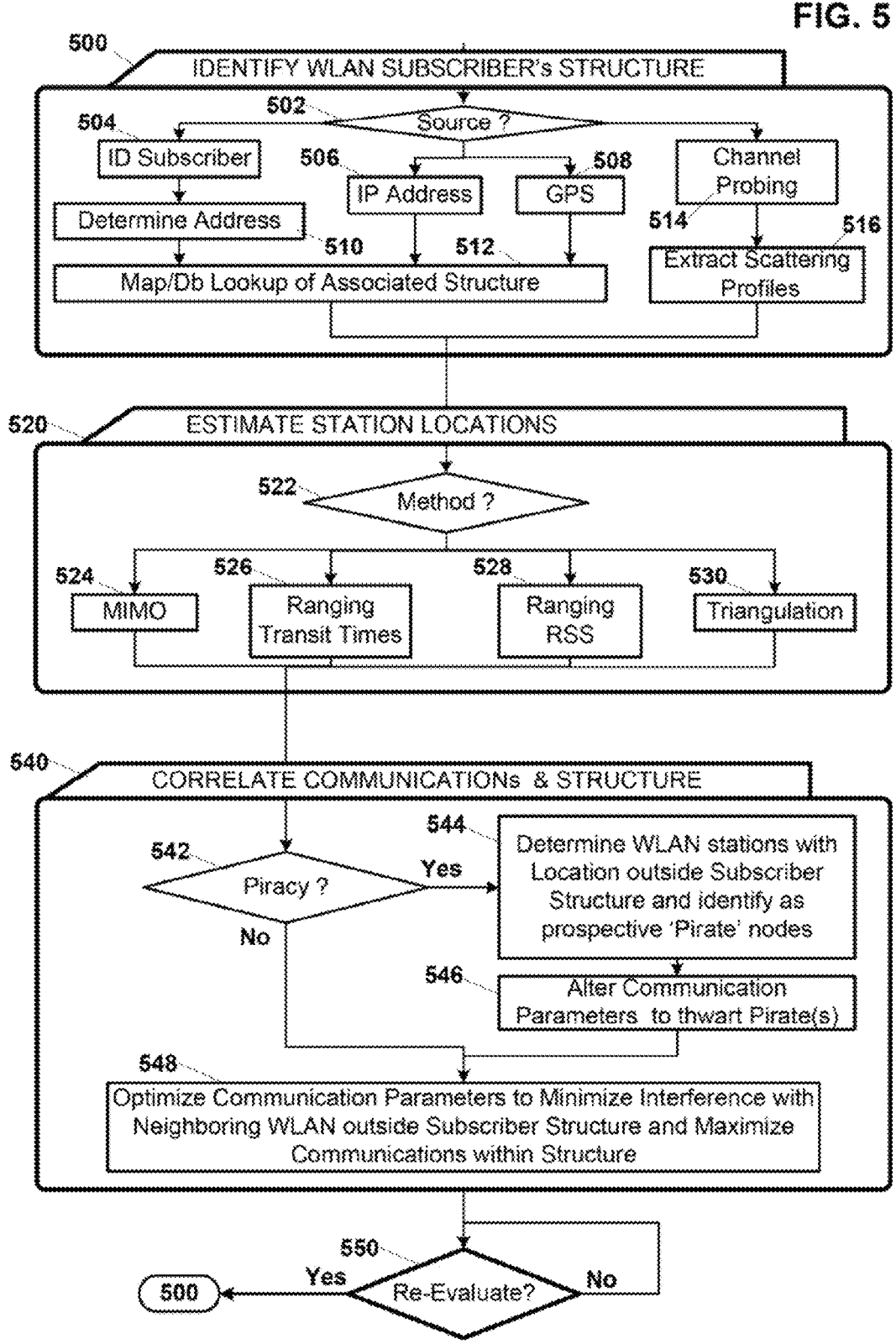
Correlating WLAN Communications & Structure

METHOD AND APPARATUS FOR CORRELATING WIRELESS LOCAL AREA NETWORK COMMUNICATION PARAMETERS WITH SUBSCRIBER STRUCTURE

CROSS REFERENCE TO RELATED APPLICATION

This application claims the benefit of prior filed co-pending Provisional Applications No. 61/654,009 filed on May 31, 2012 entitled "Service Client Location Determination" which are incorporated herein by reference in their entirety as if fully set forth herein.

BACKGROUND OF THE INVENTION

1. Field of Invention

The field of the present invention relates in general to wireless local area networks including wireless access points (WAP) and wireless stations and methods for managing same.

2. Description of the Related Art

Home and office networks, a.k.a. wireless local area networks (WLAN) are increasingly set up and serviced using a device called a Wireless Access Point (WAP). The WAP may include a router. The WAP couples all the devices of the home network, e.g. wireless stations such as: computers, printers, televisions, digital video (DVD) players and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a single channel. Each home has a WAP which forms the center piece of the associated wireless networking between all the wireless enabled devices in the home, a.k.a. wireless stations or wireless network nodes. The WAP self-selects one of a number of channels on which its network nodes or devices will communicate.

After selection of a single channel for the associated home network, the WAP controls access to the shared communication medium using a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the line is in use.

Communications on the single communication medium are identified as "Simplex" meaning, one communication stream from a single source node to one or more target nodes at one time, with all remaining nodes capable of "listening" to the subject transmission. To confirm arrival of each communication packet, the target node is required to send back an acknowledgment, a.k.a. "ACK" packet to the source. Absent the receipt of the ACK packet the source will retransmit the unacknowledged data until an acknowledgement is received, or a time-out is reached.

What is needed is an improved method of operating a WLAN.

SUMMARY OF THE INVENTION

The present invention provides a method and apparatus for managing wireless local area networks (WLAN) each supporting wireless communications between an associated access point node and associated station nodes on a corresponding one of a plurality of communication channels across an available spectrum. The apparatus comprises a structural correlation manager including a structural identifier to identify an architectural structure surrounding the WLAN; and a correlator configured to correlate the architectural structure surrounding the nodes and the communication parameters utilized by the nodes to maximize wireless communications within structure and minimize wireless communications outside the structure.

The invention may be implemented in hardware, firmware or software.

Associated methods are also claimed.

BRIEF DESCRIPTION OF THE DRAWINGS

These and other features and advantages of the present invention will become more apparent to those skilled in the art from the following detailed description in conjunction with the appended drawings in which:

FIGS. 1A-1C are network diagrams showing an embodiment of the invention with a WAP configured to independently correlate subscriber structure with subscriber signal coverage for a wireless local area network (WLAN);

FIGS. 2A-2B are network and data structure diagrams showing an embodiment of the current invention in which subscriber structure is determined based on the location of the WAP;

FIGS. 4A-4B are hardware block diagrams showing independent and master-slave embodiments of the invention respectively for correlating WLAN signal coverage and structure; and FIG. 5 is a process flow diagram of processes associated with an embodiment of the invention for correlating WLAN communications and structure.

DETAILED DESCRIPTION OF THE EMBODIMENTS

The present invention provides a method and apparatus for managing wireless local area networks (WLAN), by correlating WLAN communications and surrounding structure. This allows Telco's and Internet Service Providers (ISPs) to maximize wireless service within a subscriber's structure, and to reduce interference with neighboring wireless networks and/or prevent piracy of TV or other content delivered to the subscriber via the WiFi, IEEE 802.11 or other such wireless network.

Figure 1A:
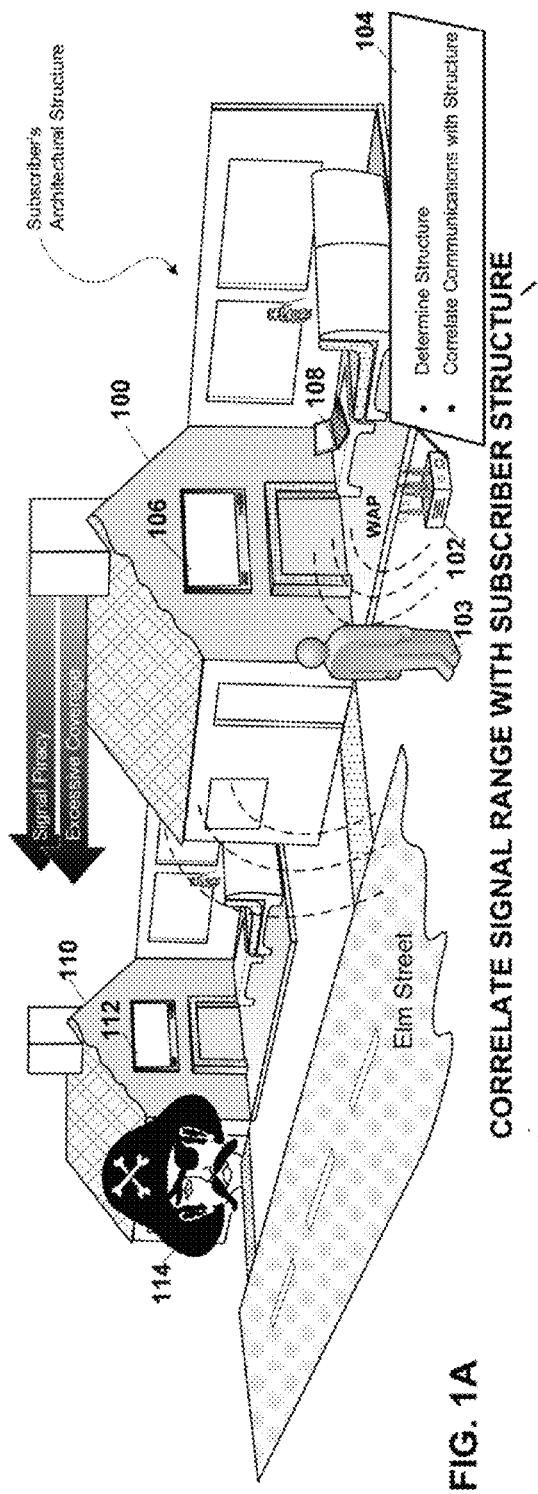
Figure 1B:
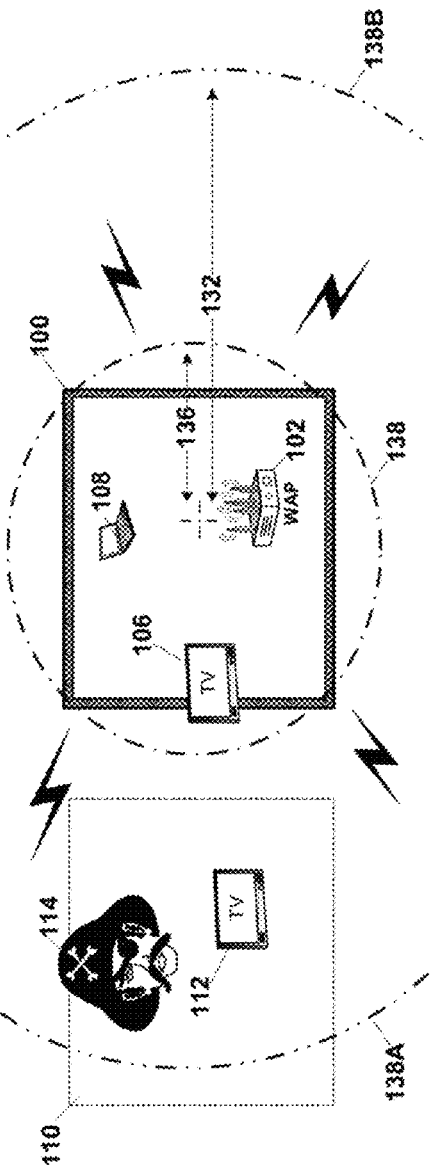

FIGS. 1A-1C are network diagrams showing an embodiment of the invention with a WAP configured to independently correlate subscriber structure with subscriber signal coverage for a wireless local area network (WLAN).

FIG. 1A is an isometric view of two adjacent homes. In FIG. 1A neighboring structures, i.e. homes 100, 110 are shown, with the signal coverage from subscriber 103's wireless access point (WAP) 102 overlapping the neighboring premises. The WAP in this embodiment of the invention implements the IEEE 802.11* standard for WLAN, with the '*' standing for the particular sub-standard, e.g. a, b, g, n, ac.

The subscriber's home/structure 110 includes a number of wireless devices, e.g. TV 106 and notebook computer 108. In the example shown, the subscriber 103 has signed up for a content delivery plan including two Televisions 106,112 one of which 112 is set up in the neighboring premises 110. This collusive behavior between neighbors, particularly in college dorms or apartments, negatively impacts the TELCO or content provider's business model because it deprives them of subscription revenue from what would otherwise be a second account, i.e. that of the neighbor 114. The current invention addresses the problem of theft of content delivery services, a.k.a. Piracy, by configuring the WAP 102 to independently correlate 104 the subscriber's structure with the subscriber's wireless coverage and further to either flag for the content provider or independently deny service to stations, e.g. station 112, participating in the subscriber's WLAN communications despite the fact that they are physically located outside the subscribers structure. In an alternate embodiment of the invention, the same methodology is used to alter signal coverage to more closely conform with the subscriber's structure, thereby reducing prospective interference with any neighboring WLAN.

FIG. 1B is a plan view of the homes shown in FIG. 1A. The radius 132 of the initial isotropic signal coverage of WAP 102 extends to a perimeter 138A-138B which lies well beyond the boundaries of the subscriber structure 100, and in fact overlaps the neighboring structure 110. In this embodiment of the invention the WAP 102 includes the capability of determining the structure for the associated subscriber and for correlating signal coverage with the structure. In this embodiment of the invention the correlation results in WAP 102 reducing for example the power level associated with the isotropic signal coverage to a range/radius 136 the perimeter/extent of which 138 more closely conforms with the boundaries of the subscribers structure 100. Stations 106, 108 within the structure continue to experience WLAN communications capabilities, while those outside the subscriber's structure, e.g. station 112, are deprived of such coverage. Two benefits result from such capability: $1^{st}$ the prevention of signal/content piracy and $2^{nd}$ the reduction in interference between neighboring networks, thus increasing the opportunity for neighboring networks to select the same one among the specified set of selectable spectrally adjacent orthogonal frequency division multiplexed (OFDM) channels of the corresponding IEEE 802.11* or WiFi standard.

In an embodiment of the invention, the WAP 102 determines the architectural structure of the subscribers dwelling/premises/home/business by probing the environment and obtaining channel estimates, a.k.a. channel matrices at different power levels and orientations. Where the WAP has multiple antenna and supports multiple-input multiple-output (MIMO) communications beamforming matrices may also be obtained. The WAP processes these to determine scattering profiles and from these extracts information about the surrounding structure. Alternately, the WAP node and all associated station nodes can perform a scan of their surrounding environment. Each device can estimate the structure of surrounding environment by analyzing reflections, scattering and diffractions from multipath wave components. In the case of MIMO system, multiple multipath wave components received by all received chains can be used to derive a MIMO channel transform matrix to provide more accurate estimate of the surrounding structure. Additionally, each device can determine its relative location to other devices by detecting and analyzing transmitted signals from other devices. After the scan is completed by each device, all information will be sent to the WAP which performs a comprehensive analysis to estimate the overall layout of the structure by considering both the information from surrounding structure of each device and relative location of all devices. Alternatively the WAP alone can gather scattering profiles and estimate the structure therefrom, albeit with less accuracy than having all devices/nodes on the WLAN scan their surrounding environment.

In another embodiment of the invention the WAP determines the subscriber's structure via a two step process involving: first, determining the IP address of the subscriber's WAP or the longitude and latitude of said WAP using an integral global positioning system (GPS) capability and second, accessing any of a number of public/private databases over the Internet to determine the corresponding structure as discussed in connection with FIGS. 2A-2B.

In another embodiment of the invention the subscriber's structure is identified by the Telco Agent and subscriber during account setup and downloaded to the WAP, or by the technician installing the WAP on the customers premises who inputs the structural characteristics directly into the WAP our uploads them to the ISP/Telco Master.

Once the structural analysis is complete the WAP correlates the network communications with the structure to maximize communications inside the subscriber's structure and minimize WLAN communications outside the subscriber's structure.

FIG. 1C is a detailed plan view of the subscriber's home 100 and the neighbors home 110 shown in FIG. 1A. The WAP 102 includes multiple antenna and support for MIMO beamforming 160. FIG. 1C shows the subscriber and neighboring premises 100 and 110 respectively. Within the subscriber premises/structure 100 station nodes: 150, 106, 108, and 154 are shown. Outside the subscriber's premises the prospective 'pirate' station node 112 in the neighboring premise 110 is shown.

The WAP 102 in this embodiment of the invention includes not only support for determining the structure 100 associated with the WLAN subscriber, but also support for determining either the relative or absolute location of all stations with which the WAP communicates. In an embodiment of the invention the WAP is configured to determine the angle and range 162, 164, 166, 168, 170 of each station 112, 150, 106, 108, 154 respectively relative to the WAP. The WAP may be configured to determine station location by analysis of MIMO beamforming orientation with respect to itself, or via triangulation with beamforming orientations aggregated from other stations on the WLAN. Alternately the WAP may determine station location by analyzing relative received signal strengths (RSS) or signal transit times between the WAP and each station.

The initial isotropic signal coverage of WAP 102 extends to a perimeter 180A-180B which lies well beyond the boundaries of the subscriber structure 100, and in fact overlaps the neighboring structure 110. Upon determining that station node 112 lies outside the subscriber structure, and is therefore a prospective 'pirate' node the WAP correlates subsequent communications to conform with the determined structural and location information. In this example, the distance 174 between prospective pirate node 112 and the WAP is less than the distance 172 between the WAP 102 a subscriber station 154 so that power attenuation will not produce the required result of maximizing communications within the subscriber structure and minimizing them outside. Instead, the WAP utilizes beamforming orientation to achieve the specified objective. Specifically beamforming is oriented so that signal coverage 182 is non-isotropic, thus maximizing signal strength inside the subscriber structure and minimizing signal strength outside the structure thus: preventing signal/content piracy and/or reducing interference with neighboring network(s).

FIGS. 2A-2B are network and data structure diagrams showing an embodiment of the current invention in which subscriber structure is determined based on the location of the WAP 102. The WAP determines the subscriber's structure via a two step process involving: first, determining the IP address of the subscriber's WAP or the longitude and latitude of said WAP using an integral global positioning system (GPS) capability and second, accessing any of a number of public/private databases over the Internet to determine the corresponding structure.

In FIG. 2A the WAP 102 includes GPS capability and is shown using GPS and associated satellites 202-204 to determine its location, expressed as longitude and latitude. The WAP then lookups the address and structure associated with those coordinates on the wide area networks to which it is connected, e.g. Internet 212 or public switched telephone network 214. In an embodiment of the invention the WAP accesses a public or private database(s) 218 hosted on one or more servers 210. One or more such databases may be required to complete the lookup of structure from geographic coordinates. In an embodiment of the invention the database maps the geolocation coordinates to either the structure itself, or the type of structure, or the square footage of the structure, or a map layout or aerial view of the structure. The WAP 102 retrieves this information 220 and uses it to identify the structure 100 of which it is a part, and further to correlate WLAN communications with the retrieved structural information.

In FIG. 2B the WAP 102 is shown using its own IP address to perform a reverse lookup for the address and structure associated with its location. The WAP performs the reverse IP address lookup on the wide area networks to which it is connected, e.g. Internet 212 or public switched telephone network 214. The WAP accesses a public or private database(s) 218 hosted on one or more servers 210. One or more such databases may be required to complete the lookup of structure from IP address. In an embodiment of the invention the database maps the IP address to either the structure itself, or the type of structure, or the square footage of the structure, or a map layout or aerial view of the structure. The WAP 102 retrieves this information 220 and uses it to identify the structure 100 of which it is a part, and further to correlate WLAN communications with the retrieved structural information.

Examples of public databases for converting an IP address to a street address include:
http://www.maxmind.com/en/geoip_demo
http://www.infosniper.net/,
http://www.networksolutions.com/whois/index.isp.

Examples of public databases for converting GPS longitude and latitude coordinates input into the search field, into a street address and further to a structure include:
http://maps.google.com/,
http://www.bing.com/maps/

Once the WAP has determined the street address, there are a number of public databases for determining the structure associated with the address such as:
http://maps.google.com/,
http://www.zillow.com
http://www.trulia.com Examples of private databases include those maintained by all Telco's and Internet Service Providers (ISPs) and Cable Providers. The WAP typically provided by the content provider, i.e. Telco, ISP or Cable Provider may be configured to autonomously perform a lookup on these databases.

In an embodiment of the invention the subscriber's structure is identified in 'coarse' terms such as: square footage, or type, e.g. house, townhouse, apartment, office or business. In another embodiment of the invention the subscriber's structure is identified in 'fine' terms such as: layout and floor plan, all of which information is also available from municipal taxing or building code authorities.

In an alternate embodiment of the invention functions discussed above as performed Independently by the WAP can instead be performed collaboratively in a master-slave relationship with the Telco, ISP or Cable Providers content provisioning system as shown and discussed in the following FIG. 3.

Figure 3:
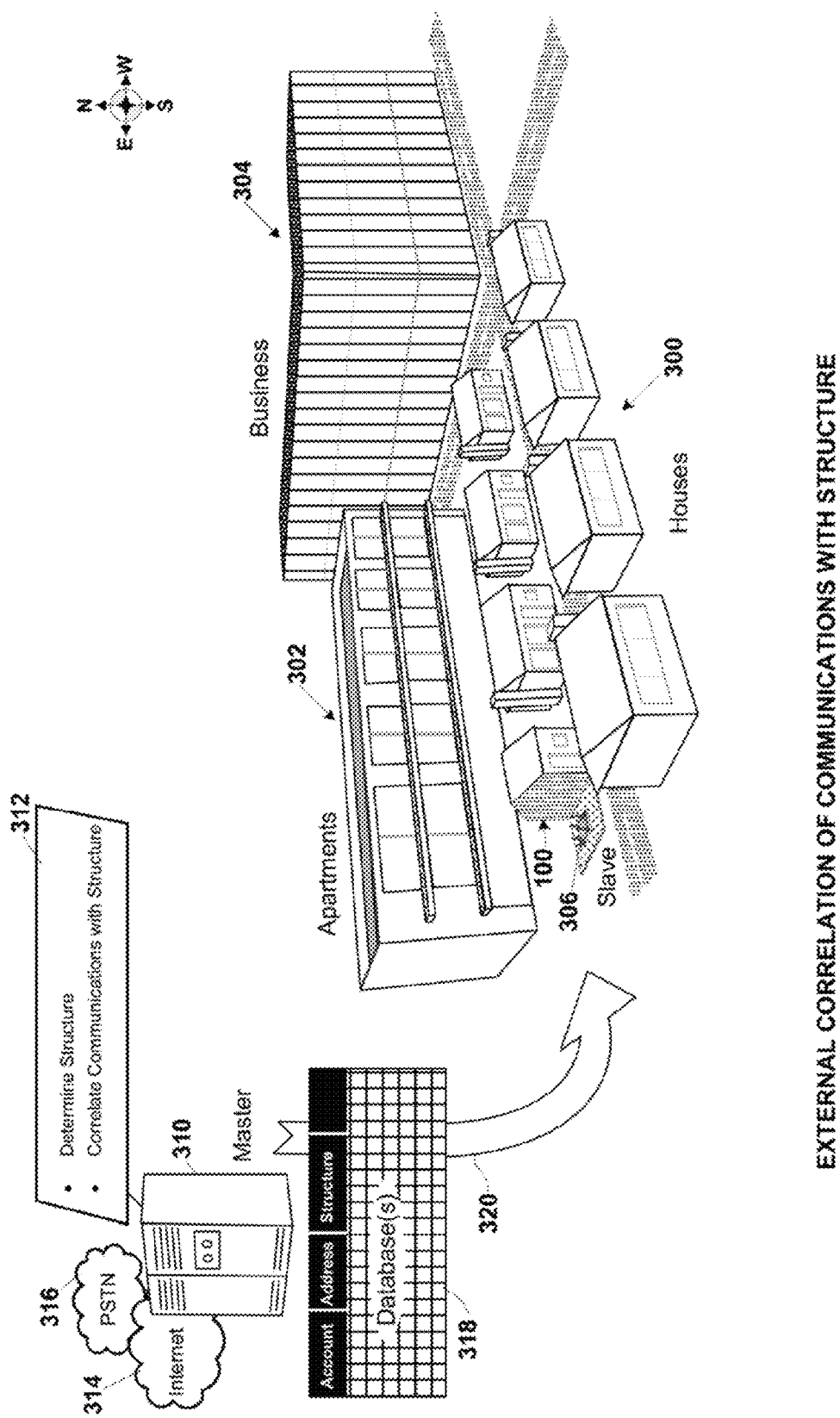
FIG. 3 is a network diagram of another embodiment of the current invention for correlating subscriber WLAN signal coverage with subscriber structure.

FIG. 3 is a network diagram of another embodiment of the current invention for correlating subscriber WLAN signal coverage with subscriber structure 100. A mixed use neighborhood including apartments 302, a business 304 and homes 300 is shown. In this embodiment of the invention structural correlation management is not performed exclusively or Independently on the WAP. Instead, the WAP 306 operates as a slave under the control of the corresponding Master server 310 at the Telco, ISP, or Cable provider to which it is coupled over the Internet 314 or PSTN 316. The Telco/ISP or Cable provider's, hereinafter Telco's, server performs the structural correlation management function 312. The server determines the structure of the subscriber's premises 100 using information uploaded from the WAP 306, such as geolocation or IP address, or by independent means such as information ascertained by the Telco about the subscriber and subscriber premises as part of the account sales or setup process, for example. The Telco maintains this information in its own private database 318. The WAP may also upload additional communication parameters from which the Telco server can determine station locations for the WLAN supported by the WAP. The Telco, ISP, or Cable provider's server then correlates this information and downloads revised/target communication parameters 320 to the WAP. The WAP implements the downloaded communication parameters; which result in increased correlation between the WLAN communications and the associated subscriber's structure 100.

FIGS. 4A-4B are hardware block diagrams showing independent and master-slave embodiments of the invention respectively for correlating WLAN signal coverage and structure.

FIG. 4A shows a WLAN node, in this case a wireless access point (WAP) 102 as shown in FIGS. 1-2, including support for independent correlation of WLAN signal coverage with the subscriber's structure. The WLAN includes: a structural correlation manager 406 and a wireless local area network (WLAN) stage 426 which includes four discrete MIMO transceiver paths capable of transmission and reception of from one to eight received streams. Only two transmit and two of the receive paths are shown for clarity.

The MIMO transceiver path components include antennas 431A and 431B. The antennas are coupled to radio frequency (RF) module 430 and baseband module 428 of the WLAN stage 426, which implements in an embodiment of the invention the IEEE 802.11* standard for WLAN, with the '*' standing for the particular sub-standard, e.g. a, b, g, n, ac.

A first MIMO receive path originates with the antenna 431A, and includes: low noise amplifier (LNA) 434A, the tunable oscillator 432 and mixer 433A which down converts the received data channel, for filtration by the channel filter 435A, conversion in the analog-to-digital converter (ADC) 436A and domain conversion from the frequency to the time domain in the Discrete Fourier Transform (DFT) module 437A. The corresponding second MIMO receive path components are labeled with the "B" suffix.

In the baseband module 428 the complex coefficients for each sub-channel in each symbol interval are subject to spatial demapping in spatial demapper 438 followed by demapping in the associated one of demappers 439A, 439B. The resultant bits are deinterleaved in the associated one of deinterleavers 440A, 440B. Next the received data is multiplexed in stream multiplexer 441 and decoded and descrambled in the decoder and descrambler 442 which couples to the packet based bus 404.

The transmit path components of two of the four transmit paths in this embodiment of the invention are also shown. The data to be transmitted is encoded and scrambled in the encoder and scrambler 450. It is then demultiplexed into independent data paths one for each antenna in the stream demultiplexer 451. Next data is interleaved and mapped in the associated one of interleavers 452A, 452B and Mappers 453A, 453B. Next the data complex coefficients corresponding to the data are spatially mapped in the spatial mapper 454 using a selected beamforming matrix. Then the mapped coefficients of each sub-channel are transformed from the frequency domain to the time domain in the associated one of inverse discrete Fourier transform (IDFT) modules 455A, 455B.

Next, in the radio frequency module 430 the digital-to-analog (DAC) conversion is accomplished by the associated one of DACs 456A, 456B, followed by filtration by the associated one of channel filters 457A, 457B then the filtered signals are upconverted in the associated one of upconverters 458A, 458B and amplified by the associated one of power amplifiers 459A, 459B each coupled to an associated one of antennas 431A, 431B for transmission to the receiving device.

The transmit and receive paths operate under control of the structural correlation manager 406. The structural correlation manager includes: a correlator component 408, a structural identifier component 410, a link target locator component 412, and a WLAN locator component 414, all of which are coupled to storage 420.

The WLAN locator 414 is configured to determine the location of the WAP. The WLAN locator determines either the longitude and latitude of the WAP using integral GPS capability or the IP Address of same.

The structural identifier component identifies the architectural structure surrounding the WAP and associated WLAN and stores the structural parameters 424 in storage 420. In embodiments of the invention which include the WLAN locator, the structural identifier component performs the requisite wide area network, e.g. Internet public/private database look-up(s) for the structure associated with the geographical coordinates or IP address provided by the WLAN locator. In another embodiment of the invention the structural identifier extracts scattering profiles from multiple-input multiple-output (MIMO) beamforming matrices between the WAP node and each associated station node, and extrapolates the surrounding structure from the scattering profiles. In still another embodiment of the invention the structural identifier uses subscriber information, e.g. address, garnered at device setup to perform an Internet public/private database lookup for the corresponding structure. In another embodiment of the invention the structural identifier accepts direct input of the structural characteristics of the subscriber's premises from the installing technician or the subscriber him/her self.

The link target locator component 412 is configured to determine either relative or actual locations for each node in the WLAN and stores the corresponding station locations 422 in storage 420. As discussed above in connection with FIG. 1C the link target locator determines these locations using any one or all of the following approaches for example: translating multiple-input multiple-output (MIMO) beamforming orientations into relative positions of each station node with respect to the WAP node; translating received signal strength (RSS) into range estimates for each station node with respect to the WAP node; translating transit time estimates for communications between the WAP node and each station node into range estimates for each station node with respect to the WAP node; and triangulating each stations location relative to the WAP using aggregated communication parameters from each of the stations.

The correlator component 408 correlates the architectural structure surrounding the nodes and the communication parameters utilized by the nodes to maximize wireless communications within the structure and minimize wireless communications outside the structure. In an embodiment of the invention the correlator component determines network nodes located outside the architectural structure surrounding the WLAN, and identifies said nodes as prospective 'pirate' nodes illicitly communicating with the WAP node. In another embodiment of the invention the correlator is further configured to alter communication parameters to thwart further communications with the pirate. Such alterations include: denying the 'pirate' node further admission to the network or reducing signal coverage outside the structure to thwart piracy. In another embodiment of the invention the correlator component simply flags the prospective 'pirate' node for further action by content provider.

In an embodiment of the invention where the WLAN device 102 comprises a wireless access point (WAP) the device also includes a broadband interface 402 for interfacing with a digital signal line (DSL) or cable modem 400.

FIG. 4B shows a WLAN node, in this case a wireless access point (WAP) 306 as shown in FIG. 3 operative as a slave with respect to an ISP, Telco or Cable Provider server operative as a master 310 to both identify the subscriber's structure and to correlate WLAN communications to conform with the identified structure.

WAP slave 306 includes a wired or wireless broadband interface 486 for coupling to the Telco/ISP master. A packet based bus 488 couples the broadband interface, a processor 480, and a wireless local area network (WLAN) stage 490 to one another. The WLAN stage has one or more antennas 492A-492B. In an embodiment of the invention the WAP supports, multiple-input multiple-output (MIMO) wireless communications and may include support for diversity and beam forming.

The processor 480 of WAP 400A is configured to support an ISP interface 482 for communications with the Telco/ISP master 310 and a communication parameter interface 484 for exchanging both initial as well as target communication parameters with the Telco/ISP master. In an embodiment of the invention the WAP may also include a global positioning (GPS) capability for providing WAP location information to the Telco/ISP.

Telco master 310 includes a structural correlation manager 460, a wired or wireless broadband interface 476 for communicating with slave WAP 306 and an interface 478 to the Internet 314. The structural correlation manager includes: a correlator component 462, a structural identifier component 464, a link target locator component 466, and a WLAN locator component 468, all of which are coupled to storage 470.

The WLAN locator 468 is configured to determine the location of the WAP using either information provided by the WAP or within the Telco database 318 (See FIG. 3).

The structural identifier component identifies the architectural structure surrounding the WAP and associated WLAN and stores the structural parameters 474 in storage 470. In embodiments of the invention which include the WLAN locator, the structural identifier component performs the requisite private database lookup(s) for the structure associated with the subscriber's account in the Telco's database 318 (See FIG. 3). In an other embodiment of the invention the structural identifier extracts scattering profiles from multiple-input multiple-output (MIMO) beamforming matrices uploaded from the WAP slave 306 and extrapolates the surrounding structure from the scattering profiles.

The link target locator component 466 is configured to determine either relative or actual locations for each node in the WLAN using channel matrices and other communication parameters uploaded from the slave WAP 306 and to store the corresponding station locations 472 in storage 470.

The correlator component 462 correlates the architectural structure surrounding the nodes and the communication parameters utilized by the nodes to maximize wireless communications within the structure and minimize wireless communications outside the structure. In an embodiment of the invention the correlator component determines network nodes located outside the architectural structure surrounding the WLAN, and identifies said nodes as prospective 'pirate' nodes illicitly communicating with the WAP node. In another embodiment of the invention the correlator is further configured to download to the slave WAP altered communication parameters which thwart further communications with the pirate.

FIG. 5 is a process flow diagram of processes associated with an embodiment of the invention for correlating WLAN communications and structure. In block processes 500 the WLAN subscriber's structure is identified. In an embodiment of the invention the subscriber's structure is identified in 'coarse' terms such as: square footage, or type, e.g. house, townhouse, apartment, office or business. In another embodiment of the invention the subscriber's structure is identified in 'fine' terms such as: layout and floor plan. In decision process 502 a determination is made as to the source of the structural information. Autonomous structural determination takes place when control is passed to process 514. In process 514 the channel beamforming matrices are obtained for each link on the WLAN. In process 516 these matrices are processed to determine scattering profiles from which information about the surrounding structure is extracted. Structural determination via IP Address and subsequent lookup of the corresponding structure takes place in processes 506, 512 respectively. Structural determination via GPS longitude and latitude coordinates and subsequent lookup of the corresponding structure takes place in processes 508, 512 respectively. Structural determination by identifying the subscriber, determining the subscriber address and looking up the corresponding structure takes place in processes 504, 510, 512 respectively.

Next control passes to block processes 520 in which the locations of all nodes on the WLAN are determined. In decision process 522 the method for estimating node locations is selected. In process 524 multiple-input multiple-output (MIMO) beamforming orientations are translated into relative positions of each station node with respect to the WAP node. Alternately in process 526 transit time estimates for communications between the WAP node and each station node are translated into range estimates for each station node with respect to the WAP node. Alternately in process 528 received signal strength (RSS) is translated into range estimates for each station node with respect to the WAP node. Alternately in process 530 each stations location relative to the WAP is triangulated using aggregated communication parameters from each of the stations.

Next control passes to block process 540 in which communications are correlated with structure. In decision process 542 a determination is made as to whether piracy detection/prevention is implemented, in which case control passes to processes 544-546. In process 544 a determination is made as to which WLAN station nodes are located outside the subscriber structure. Any such nodes are identified as prospective 'Pirate' nodes. Next in process 546 the identified pirate node is either flagged for attention/action by the content provider, e.g. Telco, ISP, Cable, or denied service. Service denial may be achieved by either denying the 'pirate' node further admission to the network or reducing signal coverage outside the structure to thwart piracy. Next control passes to process 548.

In process 548 communication parameters are optimized to minimize interference with neighboring WLAN outside the subscriber structure and to maximize communications within the subscriber structure. In an embodiment of the invention power levels are reduced. In another embodiment of the invention MIMO beamforming is oriented predominantly within the structure and attenuated outside the structure.

Next in decision process 550 a determination is made as to whether re-evaluation of communications is required. If it is then control returns to block processes 500.

In alternate embodiments of the invention correlation of WLAN communications with subscriber structure may be performed either Independently on the WAP or on the Telco/ISP server performing the identifying and correlating acts as a master with respect to the WAP node as a slave.

The components and processes disclosed herein may be implemented a software, hardware, firmware, or a combination thereof, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A structural correlation manager apparatus for managing a wireless local area network (WLAN), supporting wireless communications between a wireless access point (WAP) node and associated station nodes on a selected one of a plurality of communication channels across an available spectrum; and the structural correlation manager apparatus comprising:
   a structural identifier configured to identify an architectural structure surrounding the WLAN by extracting scattering profiles from multiple-input multiple-output (MIMO) beamforming matrices between the WAP node and each associated station node, and extrapolating the surrounding structure from the scattering profiles; and
   a correlator configured to correlate the architectural structure surrounding the nodes and the communication parameters utilized by the nodes to maximize wireless communications within the structure and minimize wireless communications outside the structure.

2. A method for managing a wireless local area network (WLAN) supporting wireless communications between a wireless access point (WAP) node and associated station nodes on a selected one of a plurality of communication channels across an available spectrum; and the method comprising:
   identifying an architectural structure surrounding the WLAN;
   determining either relative or actual locations for each node in the WLAN;
   correlating the identified architectural structure surrounding the nodes with the location of the nodes determined in the determining act to identify at least one prospective 'pirate' node located outside the architectural structure surrounding the WLAN;

correlating the identified architectural structure surrounding the nodes and the communication parameters utilized by the nodes to maximize wireless communication within the structure and minimize wireless communications outside the structure by altering communication parameters to thwart illicit communications between the WAP and the at least one prospective 'pirate' node including at least one of the acts of:

reducing a power level associated with WAP communications;

targeting multiple-input multiple-output (MIMO) WAP transmissions away from the at least one prospective 'pirate' node; and blocking communications between the WAP and the at least one prospective 'pirate' node.

3. A method for managing a wireless local area network (WLAN) supporting wireless communications between a wireless access point (WAP) node and associated station nodes on a selected one of a plurality of communication channels across an available spectrum; and the method comprising:

identifying an architectural structure surrounding the WLAN; and correlating the identified architectural structure surrounding the nodes and the communication parameters utilized by the nodes to maximize wireless communication within the structure and minimize wireless communications outside the structure, including at least one of the acts of:

reducing a power level associated with WAP communications to conform with the identified surrounding architectural structure; and targeting multiple-input multiple-output (MIMO) WAP beamforming transmissions within the identified surrounding architectural structure.

4. A method for managing a wireless local area network (WLAN) supporting wireless communications between a wireless access point (WAP) node and associated station nodes on a selected one of a plurality of communication channels across an available spectrum; and the method comprising:

determining either relative or actual locations for each node in the WLAN including at least one of the acts of:

translating multiple-input multiple-output (MIMO) beamforming orientations into relative positions of each station node with respect to the WAP node;

translating received signal strength (RSS) into range estimates for each station node with respect to the WAP node;

translating transit time estimates for communications between the WAP node and each station node into range estimates for each station node with respect to the WAP node; and triangulating each stations location relative to the WAP using aggregated communication parameters from each of the stations;

identifying an architectural structure surrounding the WLAN; and correlating the identified architectural structure surrounding the nodes with the location of the nodes determined in the determining act and the communication parameters utilized by the nodes to maximize communications within the identified architectural structure and minimize wireless communications outside the identified architectural structure.

5. A method for managing a wireless local area network (WLAN) supporting wireless communications between a wireless access point (WAP) node and associated station nodes on a selected one of a of communication channels across an available spectrum; and the method comprising:

identifying the architectural structure surrounding the WLAN by extracting scattering profiles from multiple-input multiple-output (MIMO) beamforming matrices between the WAP node and each associated station node; and extrapolating the surrounding architectural structure from the scattering profiles; and correlating the identified architectural structure surrounding the nodes and the communication parameters utilized by the nodes to maximize wireless communication within the structure and minimize wireless communications outside the structure.

\* \* \* \* \*